US005833907A

United States Patent [19]

Uchida et al.

[11] Patent Number: 5,833,907

[45] Date of Patent: Nov. 10, 1998

[54] METHOD FOR PRODUCING PATTERNED SHAPED ARTICLE

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 851,488

[22] Filed: May 5, 1997

Related U.S. Application Data

[63] Continuation of Ser. No. 415,584, Apr. 3, 1995, abandoned, which is a continuation of Ser. No. 64,443, May 21, 1993, abandoned.

[30] Foreign Application Priority Data

May 22, 1992 [JP] Japan .................................... 4-154173

[51] Int. Cl.$^{6}$ .............................. B28B 1/16; B29C 39/12; E04B 1/16

[52] U.S. Cl. .......................... 264/245; 249/104; 249/140; 264/34; 264/35; 264/255; 264/256; 264/259; 264/316; 264/333; 264/336

[58] Field of Search .................................... 264/245, 256, 264/333, 219, 316, DIG. 31, 255, 308, 336, 35, 33, 34; 425/3, DIG. 33; 249/101, 102, 103, 104, 140

[56] References Cited

U.S. PATENT DOCUMENTS

| | | | |
|---|---|---|---|
| 537,703 | 4/1895 | Mueller . | |
| 723,281 | 3/1903 | Jaques . | |
| 1,524,824 | 2/1925 | Henroz . | |
| 1,597,373 | 8/1926 | Grimm | 264/333 X |
| 1,666,232 | 4/1928 | Boynton . | |
| 2,007,961 | 7/1935 | Bolton . | |
| 2,434,477 | 1/1948 | Winter . | |

FOREIGN PATENT DOCUMENTS

| | | |
|---|---|---|
| 0 473 383 | 3/1992 | European Pat. Off. . |
| 0 479 512 | 4/1992 | European Pat. Off. . |
| 0 515 098 | 11/1992 | European Pat. Off. . |
| 635 156 | 9/1936 | Germany . |
| 2 165 616 | 6/1973 | Germany . |

*Primary Examiner*—Karen Aftergut
*Attorney, Agent, or Firm*—Oblon, Spivak, McClelland, Maier & Neustadt, P.C.

[57] ABSTRACT

A patterned shaped article is produced on a given surface by a method including the steps of disposing a partition body on the given surface, temporarily fixing a plurality of cut pattern pieces to the upper surface of the partition body or the upper surface of a mesh member disposed on the partition body so that the cut pattern pieces are disposed adjacent to each other to constitute a pattern to be formed, unfixing one of the cut pattern pieces from a portion of the upper surface to which a pattern-course material is to be supplied, supplying the pattern course material to the portion, repeating the unfixing and supplying steps until the partition body is filled with a prescribed amount of pattern-course materials, removing the partition body alone or together with the mesh member from the pattern-course materials, and allowing the pattern-course materials to set into the patterned shaped article on the given surface.

10 Claims, 7 Drawing Sheets

METHOD FOR PRODUCING PATTERNED SHAPED ARTICLE

This is a continuation of application Ser. No. 08/415,584 filed on Apr. 3, 1995 which is a continuation of application Ser. No. 08/064,443 filed on May 21, 1993, both now abandoned.

BACKGROUND OF THE INVENTION

1. Field of the Invention

This invention relates to a method for producing patterned shaped articles including patterned concrete shaped articles, patterned artificial stone shaped articles, raw materials for patterned ceramic shaped articles, patterned ceramic shaped articles, impasto shaped articles, plastic shaped articles, shaped foodstuffs, etc.

2. Description of the Prior Art

In Japanese Patent Public Disclosures No. 4-140104 and No. 4-345803, Japanese Patent Applications No. 3-273587, No. 3-273588, No. 4-73022 and No. 4-73023, and U.S. application Ser. No. 07/767,815 and Ser. No. 07/886,842, now U.S. Pat. Nos. 5,368,791 and 5,455,772, respectively, the inventors proposed methods for producing patterned shaped articles by disposing on a given surface such as the bottom plate of a main form for producing a shaped article a material retainer such as a cell form having a plurality of cylindrical cells of the same height arranged in a contiguous manner or a bristling form comprising a support member and a plurality of projections extending upright from the support member, supplying plural types of dry granular or particulate pattern-course materials into the material retainer, retaining the materials in the material retainer, and allowing the materials to set into an integral mass, and in Japanese Patent Public Disclosures No. 4-105903, No. 5-38707 and No. 5-38708 and U.S. application Ser. No. 07/750,618, now U.S. Pat. No. 5,376,321, are proposed methods for producing patterned shaped articles by disposing on a given surface such as the bottom plate of a main form for producing a shaped article an auxiliary form representing a pattern to be formed, supplying plural types of dry particulate or granular pattern-course materials inside and outside the auxiliary form, and allowing the materials to set into an integral mass.

In supplying the pattern-course materials into the cell form, between the projections of the bristling form, or inside and outside the auxiliary form at prescribed positions, it is necessary to prepare masks in the same number as the number of the kinds of the pattern-course materials to be used, in the same size as that of the main form and with openings at prescribed positions to which the pattern-course materials are to be supplied. It is possible to obtain a substantially precise pattern by supplying the pattern-course materials using the masks. However, preparation and preservation of numerous masks is troublesome. In removing a mask after the supply of a pattern-course material using the mask, there is the possibility of the supplied material under the mask flowing into or onto adjacent pattern portions already supplied or not yet supplied with another pattern-course material and for the supplied material remaining on the mask to be transferred into or onto adjacent pattern portions already supplied or not yet supplied with another pattern-course material, thus resulting in formation of a dirtied or soiled pattern.

This invention has been proposed to eliminate these disadvantages and has as its object to provide a method for producing a patterned shaped article, enabling an easy and precise supply of the pattern-course materials to prescribed portions and provision of a clear-cut pattern.

SUMMARY OF THE INVENTION

To attain the above object, this invention provides a method for producing a patterned shaped article, comprising the steps of disposing a partition body on a given surface, temporarily fixing a plurality of cut pattern pieces to an upper surface of the partition body so that the cut pattern pieces are disposed adjacent to each other to constitute a pattern to be formed, unfixing one of the cut pattern pieces from a portion of the upper surface of the partition body to which a pattern-course material is to be supplied, supplying the pattern-course material to the portion, repeating the unfixing and supplying steps until the partition body is filled with a prescribed amount of pattern-course materials, removing the partition body, and allowing the pattern-course materials to set into the patterned shaped article on the given surface.

The above and other objects, characteristic features and advantages of this invention will become apparent to those skilled in the art from the description of the invention given hereinbelow with reference to the accompanying drawings.

BRIEF DESCRIPTION OF THE DRAWINGS

FIG. 2(*b*) is a perspective view showing the main form, another partition body and the cut pattern pieces for use in performing the method of this invention, with an inset showing a partial enlarged perspective view of the partition body.

FIG. 8(*b*) is a perspective view showing the discontinuous auxiliary form formed on the bottom plate of the main form by the upright pieces.

DESCRIPTION OF THE PREFERRED EMBODIMENTS

This invention will now be described in detail with reference to the accompanying drawings.

Figure 1:
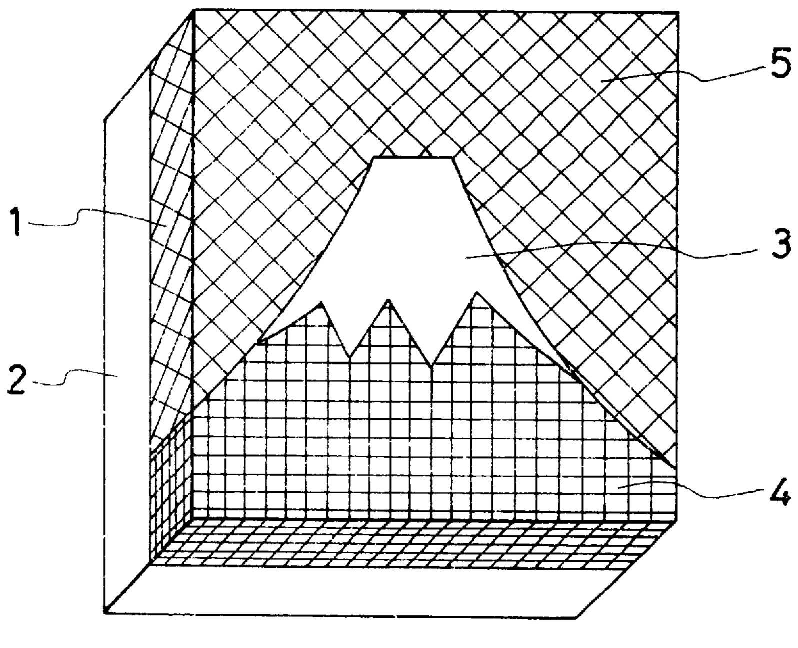
FIG. 1 is a perspective view a patterned shaped article produced by the method of this invention.

As shown in FIG. 1, a patterned shaped article produced by the method of this invention comprises a pattern course 1 and a backing layer 2. The backing layer 2 may be omitted. The pattern course 1 comprises a dry white pattern-course material 3 for representing the snow covered peak of a mountain, a dry brown pattern-course material 4 for representing the side of the mountain and a dry sky-blue pattern-course material 5 for representing the sky.

Figure 2A:
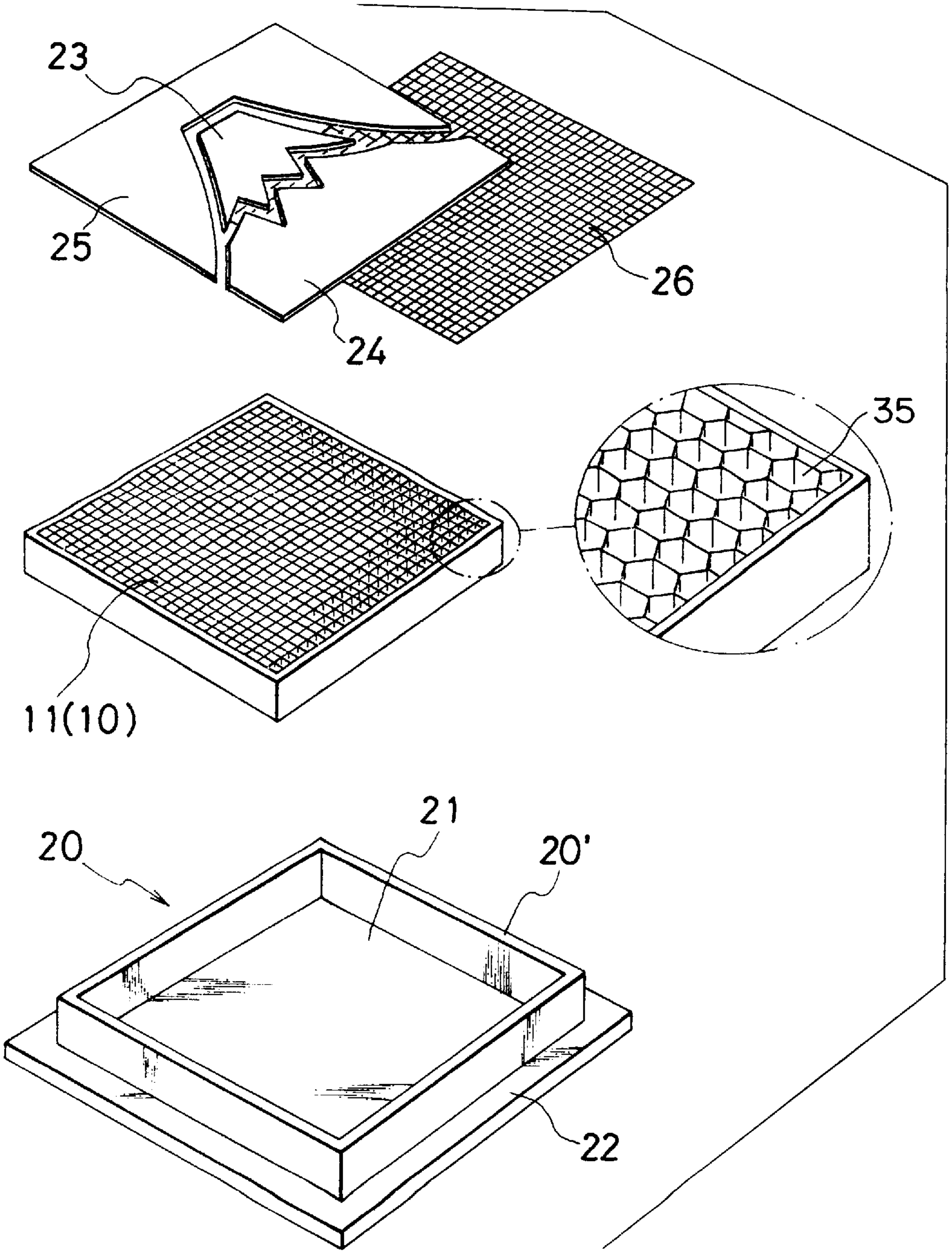
FIG. 2(*a*) is a perspective view showing a main form, a partition body and cut pattern pieces for use in performing the method of this invention, with an inset showing a partially enlarged perspective view of the partition body.
Figure 2B:
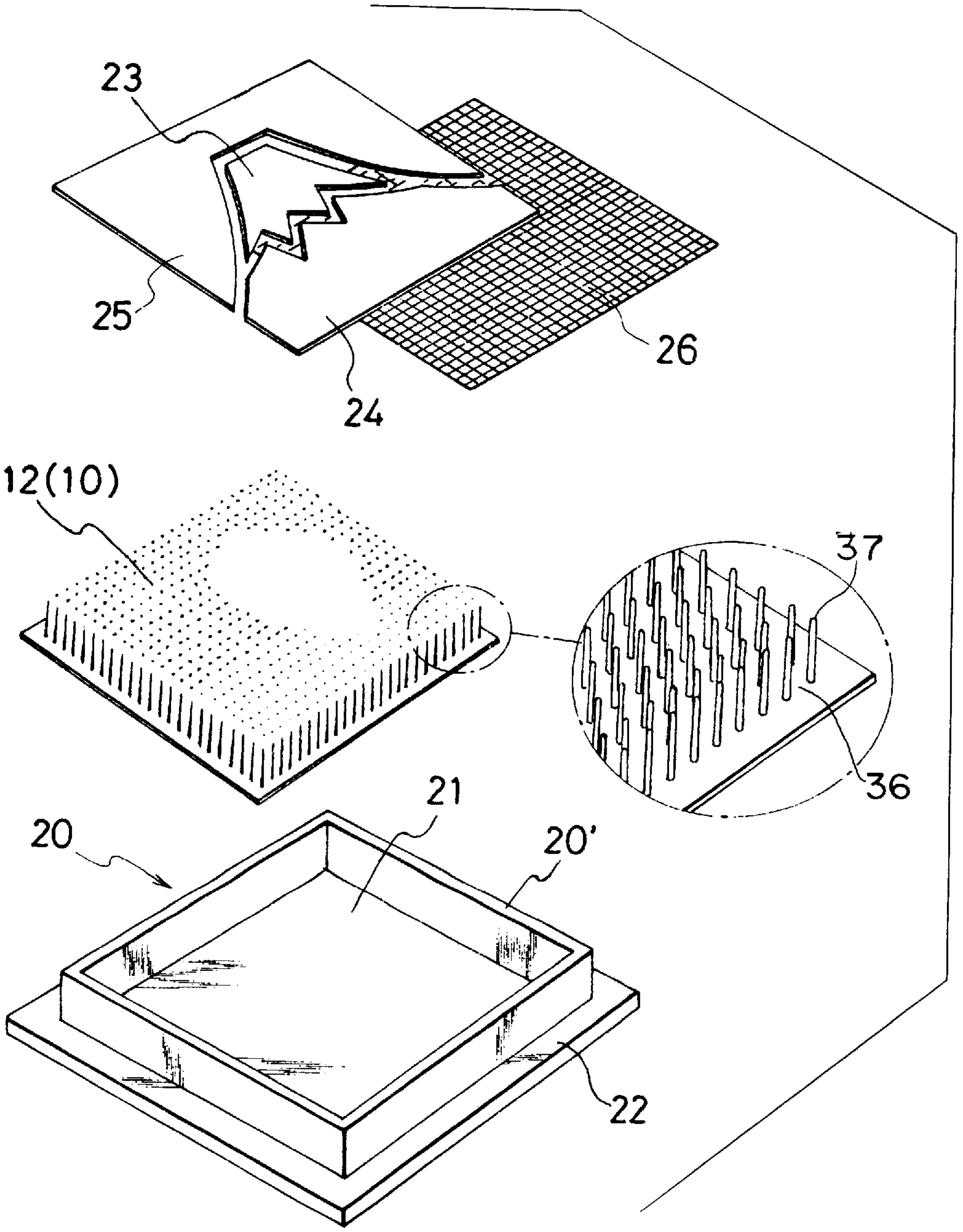

The patterned shaped article shown in FIG. 1 is produced using a cell form 11 having a plurality of empty cells 35 or a bristling form 12 serving as a partition body 10, a main form 20 having a surrounding frame 20' and a bottom plate 22 serving as a given surface 21 for disposing the partition body 10 thereon, cut pattern pieces 23, 24 and 25 separately unfixed for supplying the pattern-course materials 3, 4 and 5, and a mesh member 26 for supporting the cut pattern pieces 23, 24 and 25 thereon. These component members are shown in FIG. 2(*a*) and FIG. 2(*b*). As will be explained later, use of the mesh member 26 may be omitted and the cell form 11 and the bristling form 12 may be used either alone or in combination with each other. The three pattern pieces 23, 24 and 25 are unfixed for supplying the white pattern-course material 3 for representing the snow covered peak of a mountain, the brown pattern-course material 4 for representing the side of the mountain and the sky-blue pattern-course material 5 for representing the sky. They are temporarily fixed to the upper surface of the mesh member 26 so as to be disposed adjacent each other to constitute the pattern to be formed. The mesh member 26 permits passage of the dry, particulate or granular, pattern-course materials 3, 4 and 5 therethrough. The temporary fixation is for positioning the pattern pieces on the surface of either the partition body 10 or the mesh member 26 so as not to shift and is attained by imparting an adhesive or magnetic property to the pattern pieces. Otherwise, the temporary fixation may rely on mechanical means such as projections and springs.

Figure 3:
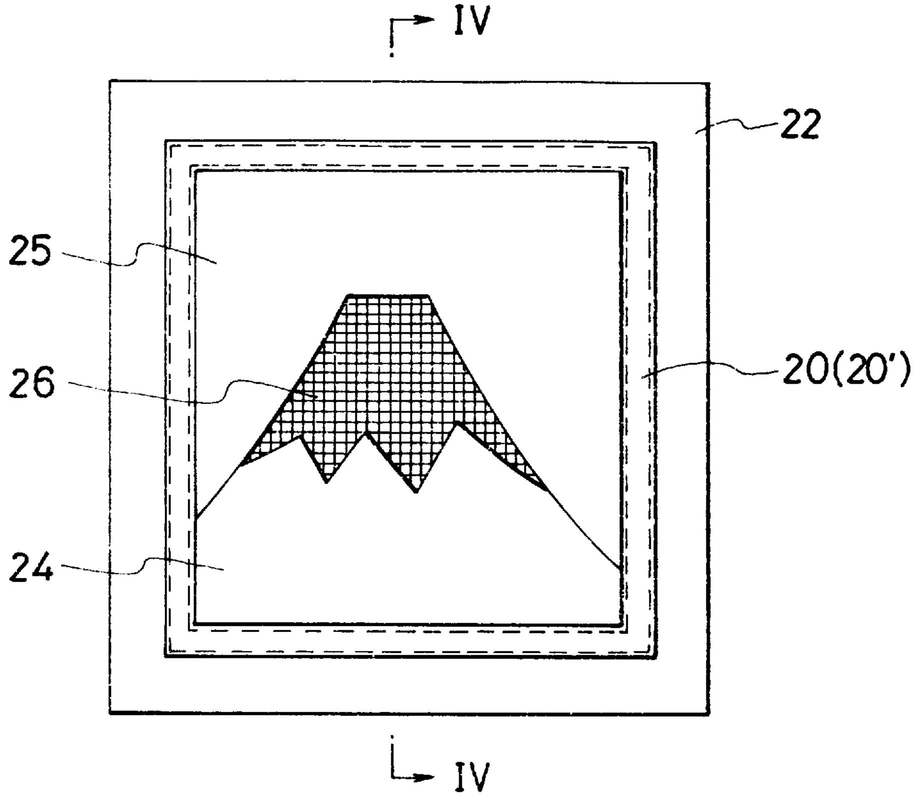
FIG. 3 is a plan view showing the state in which one of the cut pattern pieces has been unfixed and a pattern-course material has been supplied.
Figure 4:
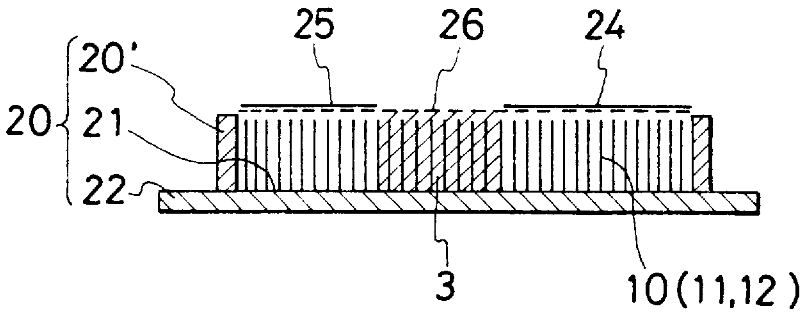
FIG. 4 is a sectional view taken along line IV—IV in FIG. 3.

The patterned shaped article shown in FIG. 1 is produced by the following procedure. The partition body 10 is disposed on the bottom plate 22 of the main form 20. The mesh member 26 having the pattern pieces 23, 24 and 25 fixed temporarily thereto is temporarily fixed to the upper surface of the partition body 10. As shown in FIG. 3 and FIG. 4, for example, the pattern piece 23 is first unfixed from the mesh member 26 to supply the white pattern-course material 3 for representing the snow covered peak of a mountain into the cells or between the projections of the partition body 10 via the exposed portion of the mesh member 26. At this time, the supplied white pattern-course material 3 does not spread over portions other than the exposed portion of the mesh member 26. After the supply of the pattern-course material 3, the unfixed pattern piece 23 is again fixed temporarily to the upper surface of the mesh member 26 at its original position and the pattern piece 25, for example, is then unfixed from the mesh member to supply the blue-sky pattern-course material 5 for representing the sky into the cells or between the projections of the partition body 10. After the supply of the material 5, the unfixed pattern piece 25 is again fixed temporarily to the upper surface of the mesh member 26 at its original position. Then, the pattern piece 24 is unfixed from the mesh member 26 to supply the brown pattern-course material 4 for representing the side of the mountain into the cells or between the projections of the partition body 10. After the supply of the material 4, the mesh member 26 is removed together with the pattern pieces 23 and 25. The material for the formation of the backing layer 2 is supplied onto the pattern-course materials 3, 4 and 5 supplied into the partition body 10 and all of the materials are moistened and, if necessary pressed, and allowed to set into an integral mass. Where the backing layer 2 is not formed on the supplied pattern-course materials, the supplied pattern-course materials are moistened and, if necessary pressed, and allowed to set into an integral mass. Thus, the patterned shaped article is produced.

In the aforementioned procedure, the unfixed pattern pieces are again fixed temporarily to the mesh member 26. This is by no means limitative. The pattern pieces may be disposed of. In this case, when the finished surface of the patterned shaped article to be produced is on the side of the bottom plate 22 of the main form 20, care should be taken so as not to spill the supplied pattern-course material on portions not filled with pattern-course materials. When the finished surface is on the side of the mesh member 26, however, it is preferable to temporarily fix the unfixed pattern pieces again to the mesh member at their respective original positions.

The mesh member 26 may be omitted as described above. In this case, the pattern pieces 23, 24 and 25 are temporarily fixed directly to the partition body 10. The subsequent procedure is followed in the same manner as described above.

When the partition body 10 is made of a material soluble in water, it need not be removed because it is dissolved by the moisture, solvent, etc. used in moistening the pattern-course materials. If the partition body 10 is made of a material insoluble in water, it has to be removed from the pattern course 1 before the pattern-course materials are allowed to completely set. When it is required to remove the partition body 10 or to make the pattern course 1 and the backing layer 2 integral with each other, it is preferable that the bottom plate 22 and the surrounding frame 20' of the main form 20 be separable from each other.

The pattern course 1 can be formed integrally on the surface of an existing concrete article. In this case, since the concrete surface serves as the given surface 21, the partition body 10 is placed on the concrete surface. Then, the mesh member 26 is superposed on the partition body 10 before the pattern pieces 23, 24 and 25 are temporarily fixed to the mesh member 26, or the pattern pieces are temporarily fixed directly to the partition body 10 without use of the mesh member 26. Subsequently, each of the pattern-course materials 3, 4 and 5 is supplied into the partition body 10 after the pattern pieces 23, 24 and 25 are unfixed one by one. The supplied materials are allowed to set into an integral mass while the supplied materials: are kept intact or after the partition body 10 is turned upside down.

Figure 5:
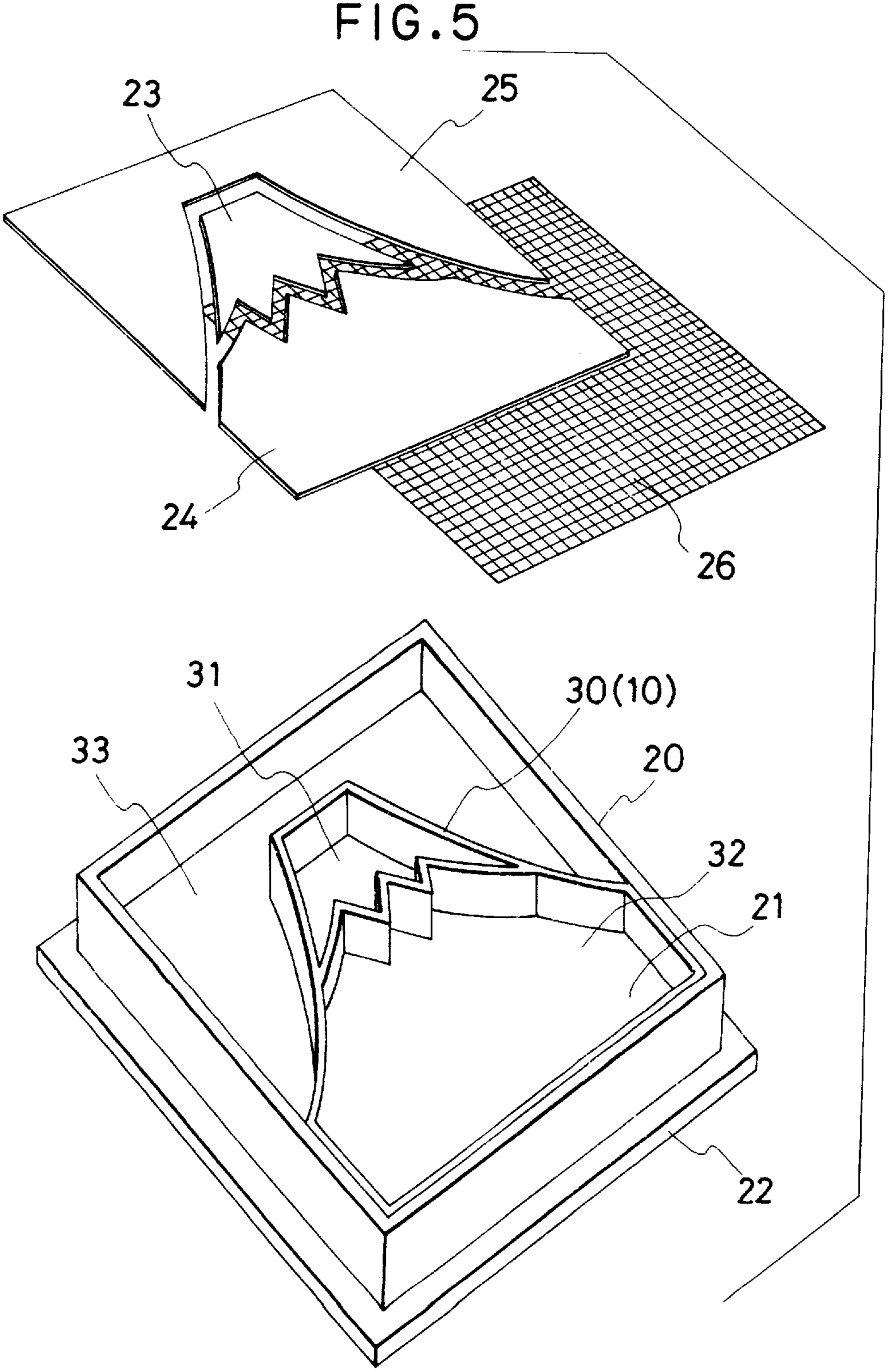
FIG. 5 is a perspective view showing the main form, still another partition body and the cut pattern pieces for use in performing the method of this invention.
Figure 6:
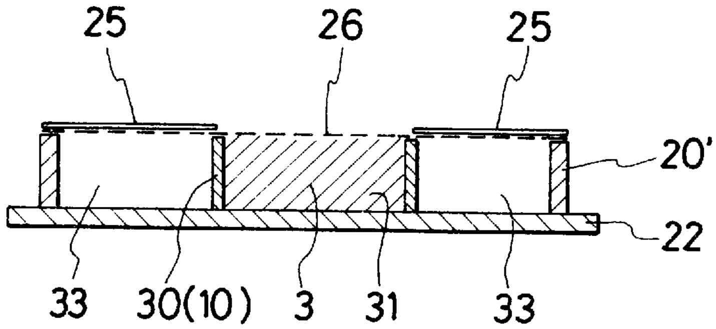
FIG. 6 is a sectional view showing the state in which one of the cut pattern pieces has been unfixed and a pattern-course material has been supplied.

As shown in FIG. 5, the patterned shaped article of FIG. 1 can be produced using a continuous auxiliary form 30 as the partition body 10. The auxiliary form 30 is disposed on the bottom plate 22 of the main form 20. The mesh member 26 having the pattern pieces 23, 24 and 25 fixed temporarily thereto is temporarily fixed to the upper surface of the main form 20. As shown in FIG. 6, for example, the pattern piece 23 is first unfixed from the mesh member 26 to supply the white pattern-course material 3 for representing the snow covered peak of a mountain into the space 31 of the auxiliary form 30 via the exposed portion of the mesh member 26. After the supply of the material 3, the unfixed pattern piece 23 is again fixed temporarily to the upper surface of the mesh member 26 at its original position and the pattern piece 25, for example, is then unfixed from the mesh member to supply the blue-sky pattern-course material 5 for representing the sky into the space 33 outside the auxiliary form 30 but inside the main form 20. After the supply of the material 5, the unfixed pattern piece 25 is again fixed temporarily to the upper surface of the mesh member 26 at its original position. Then, the pattern piece 24 is unfixed from the mesh member 26 to supply the brown pattern-course material 4 for representing the side of the mountain into the space 32 of the auxiliary form 30. After the supply of the material 4, the mesh member 26 is removed together with the pattern pieces 23 and 25. The material for the formation of the backing layer 2 is supplied onto the pattern-course materials 3, 4 and 5 supplied inside and outside the auxiliary form 30 and all of the materials are moistened and, if necessary pressed, and allowed to set into an integral mass. Where the backing layer 2 is not formed on the supplied pattern-course materials, the supplied pattern-course materials are moistened and, if necessary pressed, and allowed to set into an integral mass. Thus, the patterned shaped article is produced.

In the aforementioned procedure, the unfixed pattern pieces are again fixed temporarily to the mesh member 26. This is by no means limitative. The pattern pieces may be disposed of. In this case, when the finished surface of the patterned shaped article to be produced is on the side of the bottom plate 22 of the main form 20, care should be taken so as not to spill the supplied pattern-course material on portions not filled with pattern-course materials. When the finished surface is on the side of the mesh member 26, however, it is preferable to temporarily fix the unfixed pattern pieces again to the mesh member at their respective original positions.

Figure 8A:
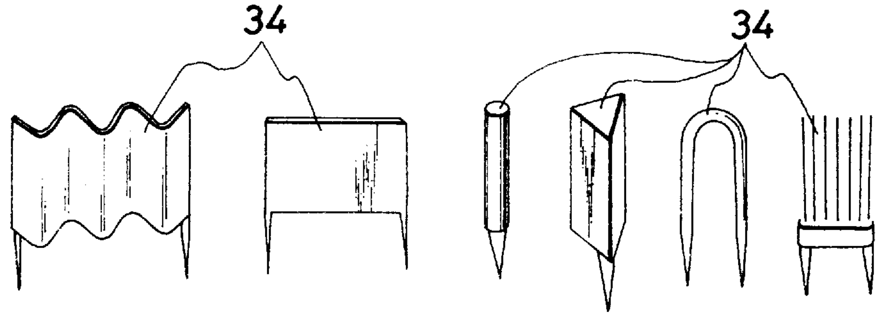
FIG. 8(*a*) is a perspective view showing various upright pieces for forming a discontinuous auxiliary form.
Figure 8B:
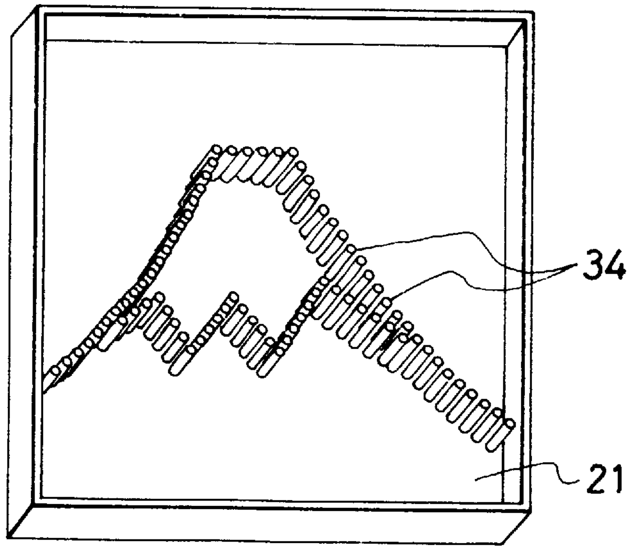

In place of the continuous auxiliary form 30 shown in FIG. 5, upright pieces 34, which may be pins, fibers, small pieces, pipes, or other member as shown in FIG. 8(*a*), can be used to form a discontinuous auxiliary form as shown in FIG. 8(*b*) by providing the upright pieces 34 at prescribed intervals on the support member serving as the given surface 21 along a pattern to be formed.

Figure 7:
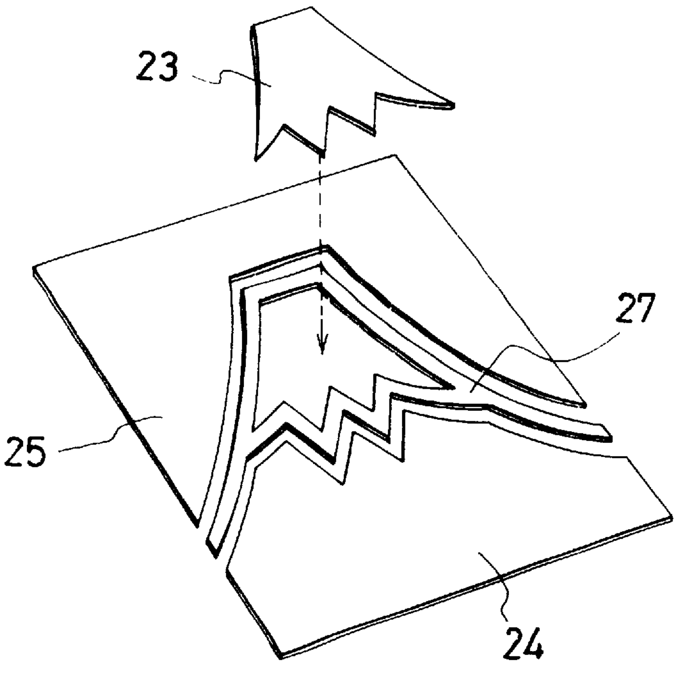
FIG. 7 is a perspective view showing another example of cut pattern pieces.

In temporarily fixing the pattern pieces 23, 24 and 25 to the continuous auxiliary form 30, if a strap-like buffer pattern piece 27 shown in FIG. 7 is placed on the boundary parts of the pattern to be formed, no problem will arise even when the relative position between the pattern pieces and the auxiliary form is shifted within the range of the width of the buffer pattern piece 27.

The mesh member 26 may be omitted as described above. In this case, the pattern pieces 23, 24 and 25 are temporarily fixed directly to the partition body 10. The subsequent procedure is in the same manner as described above.

When the auxiliary form 30 is made of a material soluble in water, it need not be removed because it is dissolved by the moisture, solvent, etc. used in moistening the pattern-course materials. If the auxiliary form 30 is made of a material insoluble in water, it has to be removed from the pattern course 1 before the pattern-course materials are allowed to completely set. When it is required to remove the auxiliary form 30 or to make the pattern course 1 and the backing layer 2 integral with each other, it is preferable that the bottom plate 22 and the surrounding frame 20' of the main form 20 be separable from each other.

The pattern course 1 can be formed integrally on the surface of an existing concrete article. In this case, since the concrete surface serves as the given surface 21, a combination of the surrounding frame 20' and the auxiliary form 30 is placed on the concrete surface. Then, the mesh member 26 is superposed on the combination before the pattern pieces 23, 24 and 25 are temporarily fixed to the mesh member 26, or the pattern pieces are temporarily fixed directly to the combination without use of the mesh member 26. Subsequently, each of the pattern-course materials 3, 4 and 5 is supplied into the spaces 31, 32 and 33 after the pattern pieces 23, 24 and 25 are unfixed one by one. The supplied materials are allowed to set into an integral mass while the supplied materials are kept intact or after the combination is turned upside down.

Each of the dry pattern-course materials 3, 4 and 5 may be one which has absorbed some moisture after drying but is not kneaded with water, oil, lubricant-bonding agent, solvent, setting agent, or plasticizer and is in a state readily amenable to pulverization before charging. The material for forming the backing layer 2 may be either such a dry material or a wet material kneaded with at least one of water, oil, lubricant-bonding agent, solvent, setting agent and plasticizer. For example, a plate of metal, wood, cement, glass or ceramic or a sheet of paper, non-woven fabric, woven fabric or plastic may be used as the backing layer 2. In this case, the surface of the plate or sheet serves as the given surface 21. The surface of an existing concrete article may be used as the given surface 21.

In the finished state, the pattern course 1 and the backing layer 2 are required to differ from each other in color, luster, texture and the like.

Examples of the dry pattern-course material for producing a concrete shaped article include cement powder, resin, a mixture of cement powder and resin, and the mixture further containing at least one of a pigment and a fine aggregate. Examples of the backing layer material include cement powder, resin, a mixture of cement powder and resin, the mixture further containing a fine aggregate and, if necessary, additionally containing a pigment and at least one of coarse aggregates and various kinds of fibers. The backing layer material may either be the same material as the pattern-course material or be in the form of a concrete slurry obtained by kneading with water etc. Wood chips may be used as an aggregate or fine aggregate. Examples of the fibers include metal fiber, carbon fiber, synthetic fiber and glass fiber.

The pattern-course material and the backing layer material may, as found necessary, further have mixed therewith pulverized particles or granules of granite, marble, etc., slag, light-reflecting grains, inorganic hollow micro-spheres including Shirasu balloons, pulverized particles or granules of ceramic, grains or granules of ceramic, metal and ore. They may also contain various additives of congealing and setting agents, water proofing agents, and inflating agents.

All the materials are caused to set within the main form by supplying all the materials into the main form and either allowing them to stand therein or supplying a prescribed amount of water etc. When the backing layer material is wet, however, the amount of water etc. to be supplied is reduced. For example, a plate of metal, wood, cement, glass or ceramic or a sheet of paper, non-woven fabric, woven fabric may be used as the backing layer. An asphaltic concrete shaped article can be produced using a thermal fusion material, such as asphalt etc.

The dry pattern-course material and the backing layer material for producing an artificial stone shaped article include wood chips and granules of rock, ceramic, ceramic, glass, plastic and metal. They may, if necessary, contain a pigment-containing aggregate and a setting agent. The setting agent is a mixture of cement powder and water, a mixture of cement powder, water and resin, or a mixture of cement powder, water and solvent and may additionally contain powders of at least one of rock, ceramic, ceramic, glass and plastic and, when necessary, may be further kneaded with a pigment or colorant and, when found necessary, may have mixed therewith various kinds of particles or granules, various kinds of fibers and various kinds of additives. Examples of the particles or granules include slag, fly ash and light-reflecting granules. Examples of the fibers include metal fiber, carbon fiber, synthetic fiber and glass fiber. Examples of the additives include shrink proofing agents, congealing and setting agents, delaying agents, water proofing agents, inflating agents, water reducing agents and fluidizing agents.

In order to enhance the adherence between the setting agent and the pigment-containing aggregate, the aggregate is spread with or immersed in water, solvent, surface treatment agent, etc.

All the materials supplied into the main form are caused to set into an integral mass by propagating a setting agent between the aggregates by means of suction under vacuum, for example. A mixture of aggregate and setting agent may be used as the backing layer material. A plate of metal, wood, cement, glass, ceramic, etc. or a sheet of paper, non-woven fabric, woven fabric, plastic, etc. may be used as the backing layer, and all the materials may be set on and together with the backing layer into an integral mass.

The dry pattern-course material for producing a ceramic shaped article or a raw material for a ceramic shaped article may, for example, be constituted of one or more of clay, glaze, and particles and granules of rock, glass, new ceramic and fine ceramic, with or without a pigment or colorant added thereto. The dry pattern-course material may be one which has absorbed some water or been added with a lubricant-bonding agent after drying, but it is not kneaded with water or the lubricant-bonding agent and is in a state readily amenable to pulverization. The backing layer material may, for example, be constituted of one or more of clay, and particles and granules of rock, glass, new ceramic and fine ceramic, with or without a pigment or colorant added thereto. In the finished state, the backing layer material is required to differ from the pattern-course materials in color, luster, texture and the like and may either be dry similar to the pattern-course materials or be kneaded with water, lubricant-bonding agent, etc. When found necessary, either the pattern-course materials or the backing layer material may contain inorganic hollow micro-spheres including Shirasu balloons, pulverized particles or granules of ceramic, grains or granules of metal, ore, etc. and may also contain various additives of foaming agents, fluidization preventing agents, supernatant agents, lubricants, bonding agents, close-contact promoting agents and the like. A raw product for a ceramic sintered article is obtained by supplying all the materials into the main form, then pressing the materials without or after adding a prescribed amount of water or lubricant-bonding agent so that the materials are plasticized into an integral mass, and removing the integral mass from the main form. The raw product is then sintered to obtain a ceramic shaped article. Otherwise, a ceramic shaped article is obtained by supplying all the materials into a refractory setter, heating the materials within the setter to melt or fuse them into an integral mass, and removing the integral mass from the setter. Otherwise, a ceramic shaped article is obtained by supplying all the materials onto a sheet of metal, glass, ceramic, etc. to form a layer of materials, melting or fusing the layer by heating to make the layer integral with the sheet. Thus, patterned enameled articles, patterned stained glass articles, patterned crystalline glass articles, etc. can be produced.

The dry pattern-course materials for producing an impasto shaped article is constituted of various kinds of powdered paints. A plate or other shaped piece of metal, wood, cement, ceramic, etc. may be used as the backing layer. Examples of the paints include acrylic resin, polyester resin, acrylic polyester hybrid resin, fluorine resin, etc. with a pigment or colorant added thereto. An impasto shaped article is obtained by supplying the powdered paints onto the plate to form a layer of paints, melting or fusing the layer by heating and baking the layer to make the layer integral with the plate. When found necessary, the layer may be pressed while making it integral with the plate.

Examples of the dry pattern-course material for producing a plastic shaped article include particles or granules of plastics, with or without a pigment and colorant added thereto, and may contain a plasticizer, solvent, etc. However, the dry pattern-course material is not kneaded with a plasticizer, solvent, etc. and is in a state readily amenable to pulverization. The backing layer material used in this case may be either a dry material or a wet material obtained by kneading with a plasticizer, solvent, etc. Examples of the plastics include polyethylene, nylon, polypropylene, polycarbonate, acetal, polystyrene, epoxy, vinyl chloride, natural rubber, synthetic rubber, acrylonitrile-butadiene-styrene, polyphenylene oxide, ethylene-vinyl acetate copolymer, fluorine resin or other thermoplastic and thermosetting resins. Both the pattern-course materials and the backing layer material may, when found necessary, contain various additives such as foaming agent, antioxidant, thermostabilizer, crosslinking agent, etc. These materials are melted or fused by heating and, if necessary, applying pressure thereto during heating, thereby obtaining an integral mass. By this method, a patterned foamed styrol shaped article, patterned plastic bathtub, floor tile, etc. can be produced. The integral mass may be made integral with a backing layer such as a plate of metal, wood, cement, ceramic, etc. or a sheet of paper, non-woven fabric, woven fabric, plastic, etc.

Examples of the dry pattern-course materials for producing confectionery or other shaped foodstuffs include particles or granules of one or more of wheat, rice, potato, bean, corn and sugar. The materials may additionally contain seasonings and spices and may also contain oil or water, but are not kneaded with oil or water and are in a state readily amenable to pulverization. The backing layer material may either be dry, similarly to the pattern-course materials, or be wetted by kneading with oil or water. Both the pattern-course materials and the backing layer material may, when found necessary, further contain an inflating agent and other additives. All the materials supplied into the main form are allowed to set or caused to set by adding a prescribed amount of water or oil to be plasticized into an integral mass. The integral mass is, when necessary, pressed and removed from the main form to obtain a raw material. The raw material is then baked. Otherwise, all the materials are baked within the main form. With this method, it is possible to produce patterned baked confectionery. It is also possible to produce a patterned chocolate shaped article etc. by using particles or granules of the material melted by heating, such as chocolate etc. and melting and fusing the particles or granules by heating.

The materials usable in the present invention are not limited to those listed above. The materials to be used are suitably selected in compliance with a shaped article to be produced. The materials which, in the finished state, differ in color, luster, texture and the like can be used in combination with each other. When casting sand or powdered metal is used, for example, it is possible to obtain castings or sintered metal at high speed.

In producing any of the aforementioned patterned shaped articles, the movement of the materials can be promoted by applying vibration during the supply of the materials. By rubbing with a brush or comb or applying a jet of air or water to the portion at the boundary between the different kinds of materials for the pattern course, the pattern can be blurred.

By laying a mat of non-woven fabric or any other water or oil absorbing material on the given surface or pattern course, any excess amount of water, oil, lubricant-bonding agent, plasticizer or solvent contained in part of the materials can be absorbed or supplied to another part of the materials to uniformize the amount of water, oil, lubricant-bonding agent, plasticizer or solvent in the entire shaped article. In this case, since the water (auxiliary agent) to cement (resin) ratio of the shaped article becomes small, the strength of the shaped article can be enhanced. An air-permeable mat is advantageously used in press molding the supplied materials because degassing is promoted to enable production of a dense shaped article. Application of vibration or pressure to one or both of the pattern-course materials and the backing layer material when they are being allowed to set into an integral mass makes the pattern course and backing layer dense, thus enhancing the strength of a shaped article. A shaped article can be reinforced with long fiber, short fiber, wire mesh or other reinforcement placed in or between the pattern course and the backing layer. When any article obtained by the sheet making method or extrusion molding method, plate or sheet is used as the backing layer, the shaped article obtained can be used as an architectural panel or board, a wall sheet, tile or the like. When the surface of an existing concrete article is used as the given surface, for example, a layer of pattern-course materials can be made integral with the surface of the existing concrete article.

In the method of the present invention, when a deformable mat is used as the given surface or when a partially or entirely deformable main form is used, it is possible to produce a patterned shaped article having a curved finished surface. Temporary fixation of the pattern pieces can be attained by imparting them with adhesive or magnetic property or by use of mechanical means. When the cut pattern pieces are obtained from an adhesive sheet, for example, since the adhesive sheet is thin and inexpensive, the pieces are easy to handle and dispose of. When a magnetic rubber sheet is used as the material for the cut pattern pieces, a pattern piece once unfixed can be fixed again to its original position with ease. As the methods utilizing a mechanical means, an insertion-fit method utilizing spring force can be advantageously adopted.

As has been described in the foregoing, this invention provides a method for producing a patterned shaped article, which includes the steps of fixing a plurality of cut pattern pieces temporarily to the upper surface of a partition body so that they are disposed adjacent to each other to constitute a pattern to be formed and supplying pattern-course materials separately into the partition body after the cut pattern pieces are unfixed one by one. Since the size of all the pattern pieces disposed adjacent to each other is substantially the same as that of the pattern course of the shaped article, a small space will suffice for the storage thereof, and it is possible to simplify and rationalize the production steps. Furthermore, since the pattern pieces are unfixed one by one to supply a pattern-course material to a portion from which one of the pattern pieces has been unfixed, the supplied pattern-course material is prevented from entering the remaining portions and, therefore, it is possible to obtain a shaped article having a clear-cut pattern with high reproducibility.

Obviously, numerous modifications and variations of the present invention are possible in light of the above teachings. It is therefore to be understood that within the scope of the appended claims, the invention may be practiced otherwise than as specifically described herein.

What is claimed is:

1. A method for producing a patterned shaped article, which comprises the steps of:

disposing on a given surface at least one auxiliary form of a shape corresponding to a pattern to be formed and having a plurality of unfilled areas;

disposing a mesh member on said at least one auxiliary form;

temporarily disposing a plurality of separate, unfixed, cut pattern pieces onto an upper surface of said mesh member so that said cut pattern pieces are disposed adjacent each other so as to comprise said pattern to be formed;

removing one of said cut pattern pieces from a portion of said upper surface of said mesh member;

supplying a dry pattern-course material into said auxiliary form through said portion;

repeating said removing and supplying steps until a prescribed amount of pattern-course materials is supplied into said auxiliary form;

removing said mesh member and said auxiliary form from said supplied pattern-course materials; and allowing said supplied pattern-course materials to set into said patterned shaped article on said given surface.

2. A method according to claim 1, wherein said auxiliary form comprises a continuous partition body.

3. A method according to claim 1, wherein said auxiliary form comprises a discontinuous partition body formed of a plurality of upright pieces.

4. A method according to claim 1, wherein said mesh member, having said plurality of cut pattern pieces temporarily disposed onto said upper surface of said mesh member so that said cut pattern pieces are disposed adjacent each other so as to comprise said pattern to be formed, is disposed on said at least one auxiliary form.

5. A method for producing a patterned shaped article, which comprises the steps of:

disposing on a given surface a cell form having a plurality of empty cells;

temporarily disposing a plurality of separate, unfixed, cut pattern pieces onto an upper surface of said cell form so that said cut pattern pieces are disposed adjacent each other so as to comprise a pattern to be formed;

removing one of said cut pattern pieces from a portion of said upper surface of said cell form;

supplying a dry pattern-course material into said empty cells of said cell form through said portion of said upper surface of said cell form;

repeating said removing and supplying steps until a prescribed amount of pattern-course materials is supplied into a prescribed number of cells of said cell form;

removing said cell form from said supplied pattern-course materials; and allowing said supplied pattern-course materials to set into said patterned shaped article on said given surface.

6. A method for producing a patterned shaped article, which comprises the steps of:

disposing on a given surface located in a frame a projection bristling form comprising a support member and a plurality of projections extending from said support member with a prescribed density and including a plurality of empty spaces respectively located between said projections, said projections having a height dimension substantially equal to or less than a height dimension of said frame;

temporarily disposing a plurality of separate, unfixed cut pattern pieces onto an upper surface of said projection bristling form so that said cut pattern pieces are disposed adjacent each other so as to comprise a pattern to be formed;

removing one of said cut pattern pieces from a portion of said upper surface of said projection bristling form;

supplying a dry pattern-course material into said empty spaces between said projections of said projection bristling form through said portion;

repeating said removing and supplying steps until a prescribed amount of pattern-course materials is respectively supplied into a prescribed number of spaces of said projection bristling form;

removing said projection bristling form from said supplied pattern-course materials; and allowing said supplied pattern-course materials to set into said patterned shaped article on said given surface.

7. A method for producing a patterned shaped article, comprising the steps of:

disposing on a given surface a cell form having a plurality of empty cells;

disposing a mesh member on said cell form;

temporarily disposing a plurality of separate, unfixed cut pattern pieces onto an upper surface of said mesh member so that said cut pattern pieces are disposed adjacent each other so as to comprise a pattern to be formed;

removing one of said cut pattern pieces from a portion of said upper surface of said mesh member;

supplying a dry pattern-course material into said cell form through said portion of said mesh member;

repeating said removing and supplying steps until a prescribed amount of pattern-course materials is supplied into a prescribed number of said empty cells of said cell form;

removing said mesh member and said cell form from said supplied pattern-course materials; and allowing said supplied pattern-course materials to set into said patterned shaped article on said given surface.

8. A method according to claim 7, wherein said mesh member, having said plurality of cut pattern pieces temporarily disposed onto said upper surface of said mesh member so that said cut pattern pieces are disposed adjacent each other so as to comprise said pattern to be formed, is disposed on said cell form.

9. A method for producing a patterned shaped article, which comprises the steps of:

disposing on a given surface a projection bristling form comprising a support member and a plurality of projections extending from said support member with a prescribed density and having a plurality of empty spaces respectively formed between said projections;

disposing a mesh member on said projection bristling form;

temporarily disposing a plurality of separate, unfixed cut pattern pieces onto an upper surface of said mesh member so that said cut pattern pieces are disposed adjacent each other so as to comprise a pattern to be formed;

removing one of said cut pattern pieces from a portion of said upper surface of said mesh member;

supplying a dry pattern-course material into said empty spaces between said projections of said projection bristling form through said portion;

repeating said removing and supplying steps until a prescribed amount of pattern-course materials is respectively supplied into a prescribed number of said empty spaces of said projection bristling form;

removing said mesh member and said projection bristling form from said supplied pattern-course materials; and allowing said supplied pattern-course materials to set into said patterned shaped article on said given surface.

10. A method according to claim 9, wherein said mesh member, having said plurality of cut pattern pieces temporarily disposed onto said upper surface of said mesh member so that said cut pattern pieces are disposed adjacent each other so as to comprise said pattern to be formed, is disposed on said projection bristling form.

* * * * *